July 27, 1965 E. R. MEINERS ETAL 3,196,599
AUTOMATIC HEIGHT CONTROL SYSTEM
Filed May 20, 1963 3 Sheets-Sheet 1
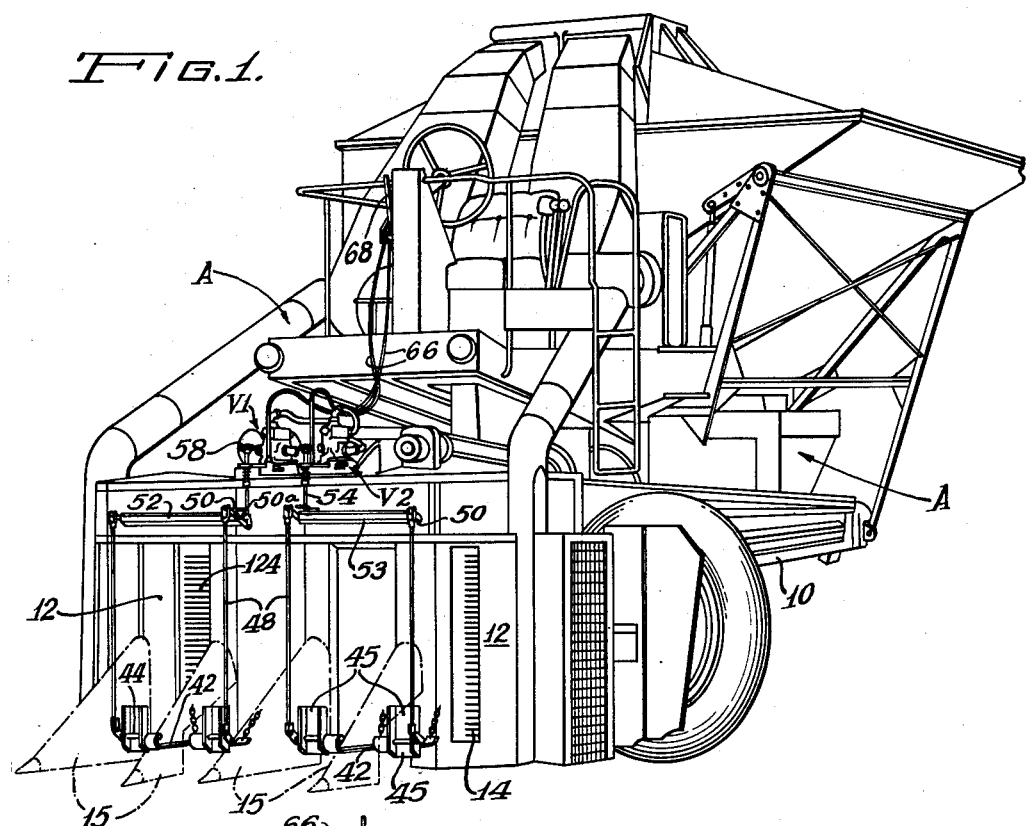
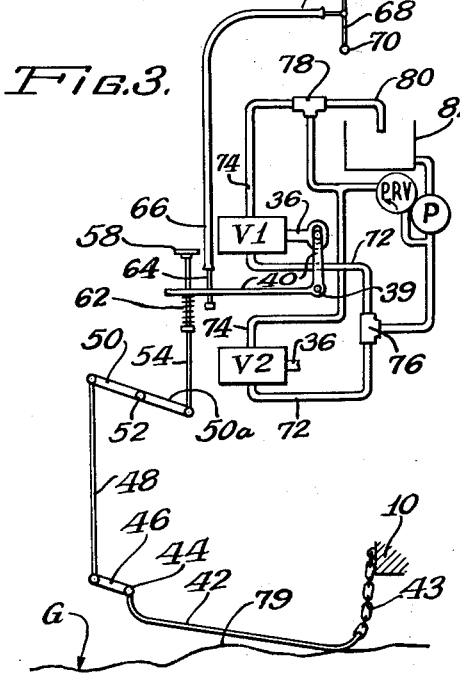
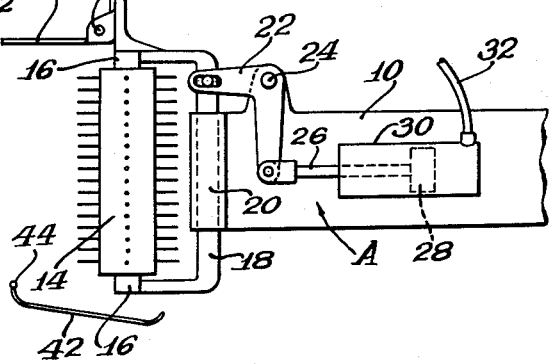
Inventors:
Elmo R. Meiners
Melvin E. Bonomo
By Bair, Freeman & Molinare
Attys.

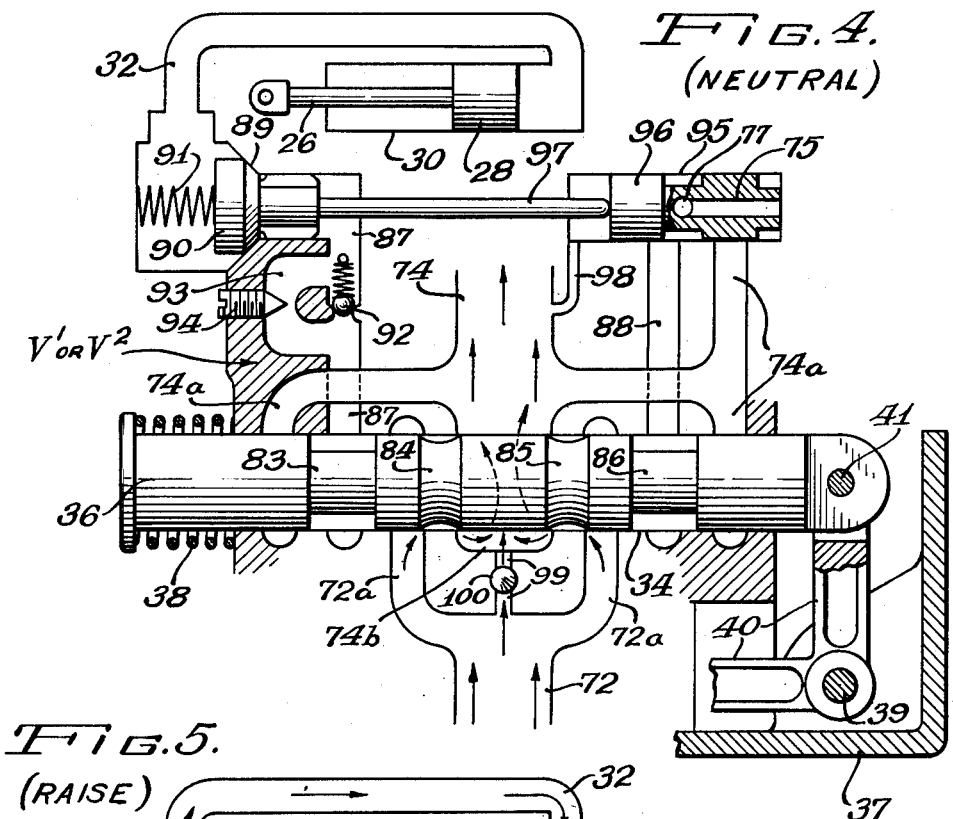

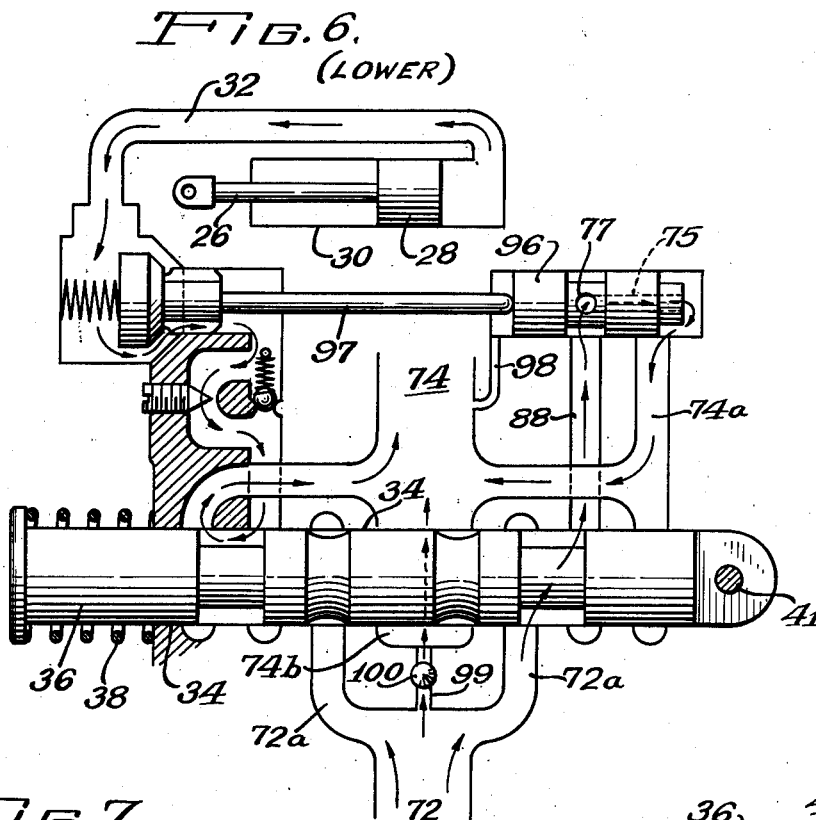
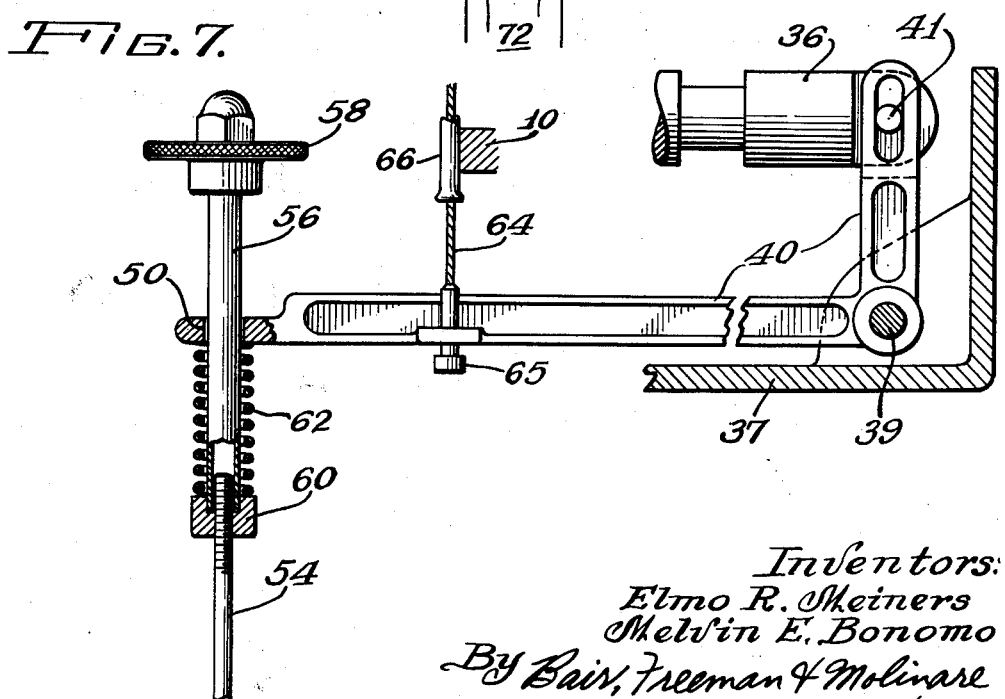

United States Patent Office 3,196,599
Patented July 27, 1965

3,196,599
AUTOMATIC HEIGHT CONTROL SYSTEM
Elmo R. Meiners, Anchor, Ill., and Melvin E. Bonomo,
R.R. 9 E., Gibson City, Ill.
Filed May 20, 1963, Ser. No. 281,444
2 Claims. (Cl. 56—11)

This invention relates to an automatic height control system for a row crop machine such as a cotton picker or the like.

One object of the invention is to provide ground contour responsive means for automatically controlling the height of a crop manipulating head such as one provided with cotton picker drums, the operation of which are at present manually controlled.

Another object is to provide a hydraulic control valve for a hydraulically operated means which is operable to effect vertical adjustment of a crop manipulating head, the ground contour responsive means being operatively connected with the hydraulic control valve to position the same whereupon the hydraulically operated means responds in such manner as to raise the head upon encountering a rise in the ground contour and to lower it when encountering a dip in the ground surface, the head being thereby automatically and continuously adjusted to suit the ground contour regardless of the attitude of the frame of the machine as it travels across the ground surface.

Another object is to provide a system for sensing both sides of a row along which a crop manipulating head is travelling to automatically maintain the crop manipulating head at a desired height above the ground, thereby avoiding damage to mechanism of the head such as cotton picking drums which are relatively expensive and have bearings at the lower end which, if they gouge into the ground, soon wear out.

Still another object is to provide, in a multi-row crop machine, a ground sensing means for each row and controlling only the crop manipulating head for that row so that each head is controlled independent of the other and properly protected against damage depending on the ground contour which they individually encounter.

A further object is to provide ground contour responsive means including a ground engageable shoe extending downwardly and rearwardly from a pivot point, and means for operatively connecting the shoe to a hydraulic control valve to cause the same to operate and control hydraulically operated adjusting means for the crop manipulating head in such manner as to modulate the position thereof in response to ground contour, constantly maintaining the crop manipulating head at a desired distance from the adjacent ground surface.

With these and other objects in view, our invention consists in the construction, arrangement and combination of the various parts of our automatic height control system, whereby the objects above contemplated are attained, as hereinafter more fully set forth, pointed out in our claims and illustrated in detail on the accompanying drawings, wherein:

FIG. 1 is a perspective view of a cotton picker representative of a row crop machine to which our height control system is applicable;

FIG. 2 is a diagrammatic view of power means of hydraulic type usually provided on machines of this type for adjusting the height of a crop manipulating head such as a picker drum of a cotton picker;

FIG. 3 is a mechanical and hydraulic diagram of individual hydraulic control valves for a two-row machine;

FIG. 4 is a diagrammatic view of the control valve used and showing its relation to the power means of FIG. 2;

FIG. 5 is a similar diagrammatic view showing the control valve in "raise" position;

FIG. 6 is a similar diagrammatic view showing the control valve in "lower" position, and FIG. 7 is a detail of a mechanical connection from a ground contour responsive means to a lever of the control valve and of a manual override means therefor.

On the accompanying drawings we have used the reference character A to indicate in general a row crop machine such as a cotton picker. Gathering shoes 15 of the machine A are shown dotted in FIG. 1 to permit showing of the parts of our system thereadjacent. The picker A includes a frame 10 and crop manipulating heads 12 supported thereby. Two such heads are illustrated. In each head, cotton picker drums 14 are mounted, one of which is shown in FIG. 2 as being supported by bearings 16 and a bearing support 18 which is movable in a slide 20 and controlled by a bell crank 22 pivoted at 24. A piston rod 26 is operatively connected to the bell crank 22 and has a piston 28 in a hydraulic cylinder 30. A hydraulic hose 32 is shown connected with the cylinder 30, the parts 10 to 32 all being conventional in a cotton picker or the like.

In FIG. 1 a control valve V1 is shown for the right-hand drum 14 of the machine A and a control valve V2 for the left-hand drum 14. Referring to FIG. 4 a hydraulic diagram is shown for the control valve V1 or V2 in its neutral position. The valve comprises a suitable body portion as shown in FIG. 1 in which is bored the cylinder 34 of FIG. 4, a valve plunger 36 being reciprocable therein and biased in a left-hand direction by a return spring 38. Referring to FIG. 7 the valve plunger 36 is adapted to be slid in the cylinder 34 under the action of a control lever 40 of bell crank type pivoted at 39 to a bracket 37 that supports the valves V1 or V2. The bracket 37 is secured to the bearing support 18 as shown in FIG. 2 so that the valve V1 or V2 is bodily raised and lowered therewith. The plunger 36 has a pin 41 with which a slot of the control lever 40 coacts, and the long arm of the control lever is mechanically actuated in a manner which will now be described.

Referring to FIG. 3 a ground engageable shoe 42 is shown pivoted at 44 on a suitable bracket 45 as shown in FIG. 1 and a lever 46 is adapted to be oscillated by the ground engageable shoe 42 as it responds to the contour of the ground illustrated at G in FIG. 3. A link 48 is connected with the lever 46 and extends upwardly to a rock lever 50 pivoted at 52 on a bracket 53 shown in FIG. 1. The brackets 45 and 53 are mounted on the picker frame 10. Chains 43 may be used to limit the drop of the shoes. It will be noted there are four of the shoes 42, two for each of the two rows for which the cotton picker A is designed, one shoe being on each side of the row. There are likewise two of the levers 46, two of the links 48 and two of the rock levers 50 as shown in FIG. 1, and one of the two rock levers for each row has an extension 50a from which a rod 54 extends upwardly.

As shown in FIG. 7 this rod is threaded at its upper end and an adjusting sleeve 56 terminating in a collar 60 is threaded thereon, an adjusting knob 58 being provided at the upper end of the adjusting sleeve. The sleeve extends loosely through an opening 57 of the control lever 40 and a spring 62 is mounted between the collar 60 and the lever. The spring 62 acts as a thrust member and is considerably stronger than the spring 38 of FIG. 4 so as to readily overcome the latter when the collar 60 is moved upwardly (the position shown in FIG. 5). When the collar 60 moves downwardly the spring 38 expands as in FIG. 6 causing the lever 40 to follow the spring 62. The lever 40 may be moved upwardly independent of the upward movement of the collar 60 by means of a cable 64 which slides through a cable guide tube 66 secured to the frame 10 of the cotton picker and the cable terminates at a connection with a manual override lever 68 shown in FIG.

1. A cable 64 is provided for each crop manipulating head of the machine and all are connected to the lever 68.

Returning to the valve V1 or V2 as shown in FIGS. 3 and 4, the valve body has an inlet 72 and an outlet 74. The inlet 72 of the two valves V1 and V2 receive oil from a pump P through a 50—50 flow divider 76. The outlets 74 are connected to a T 78 and the T has a pipe 80 in the form of a return line to an oil reservoir 82 from which the pump P receives oil in the usual manner.

The valves V1 and V2 are of special construction as fully disclosed and claimed in the copending application of Melvin E. Bonomo, Serial No. 296,560, filed July 22, 1963, but will be briefly described herein in order to disclose how the drums 14 are automatically controlled through the hydraulic cylinders 30 by the control valves which in turn are mechanically actuated by the shoes 42 through the parts 44 through 62 as described in connection with FIGS. 3 and 7. The valve plunger 36 is provided with oil grooves 83, 84, 85 and 86 as shown in FIG. 4. The inlet 72 has branches 72a and the outlet 74 has branches 74a for cooperating with the oil grooves. There are also passageways 87 and 88 that cooperate with the oil grooves. The passageway 87 leads to a valve seat 89 on which a valve 90 is normally seated by means of a spring 91. The valve seat 89 communicates with a hydraulic hose 32. In the passageway 87 a check valve 92 is provided. A passageway 93 bypasses the check valve 92 and is restricted in character by means of an adjustable needle valve 94.

The passageway 88 leads to a cylinder 95 in which is slidably mounted a spool-like actuating plunger 96. The plunger 96 has a cross hole 77 with which a passageway 75 connects and extends to the right-hand end of the plunger. The plunger is adapted at times to open the valve 90 through a stem 97 (see FIG. 6). One of the branches 74a is also connected to the cylinder 95 and a vent passageway 98 connects one end of the cylinder 95 to the outlet 74.

The outlet passageway 74 surrounds the central portion of the valve plunger 36 as shown at 74b and a passageway 99 shunts oil from the inlet 72 to the outlet section 74b through the control of an adjustable needle valve 100.

*Practical operation*

The neutral positions of the parts of the control valve V1 or V2 are shown in FIGS. 3, 4 and 7. In this position the oil grooves 84 and 85 permit free flow of oil from the inlet 72 to the outlet 74 since oil pressure is not needed at this time and it is desirable to relieve the pressure in the hydraulic system. A small amount of oil under control of the needle valve 100 also flows through the passageway 99, all as indicated by arrows. Any excess pressure is relieved through a pressure relief valve PRV shown in FIG. 3.

If the shoe 42 encounters a bump such as shown at 79 in FIG. 3 it will be raised. The spring 62 will accordingly raise the long arm of the bell crank 40 so that its short arm moves toward the right and thereby moves the valve plunger 36 toward the right as shown in FIG. 3 against the action of the return spring 38. At this time the incoming oil is flowing from the inlet 72 through the oil groove 83 to the passageway 87 thereby opening the check valve 92 so that the oil acts on the valve 90 to open it against the action of the spring 91 and flows to the hydraulic cylinder 30 for moving the piston 28 and thereby the rod 26 toward the left to raise the drum 14 as will be obvious by referring to FIG. 2. As the drum rises, its support 18, the bracket 37, the control valve and the lever pivot 39 likewise rise to bring the parts back to neutral balance unless the shoe 42 is being raised farther by the bump 79. Neutral balance will be achieved when the shoe senses the maximum height of the bump.

If the shoe 42 drops into a depression rather than riding over a bump, the collar 60 and spring 62 will be lowered thereby permitting the return spring 38 to expand as in FIG. 6 to cause the lever 40 to follow the spring 62, and the oil grooves 83, 84, 85 and 86 will assume the new position shown in FIG. 6 wherein the groove 86 permits oil to flow from the inlet 72 to the passageway 88 and through the cross hole 77 and the passageway 75 of the actuating plunger 96 to move the plunger toward the left so that the stem 97 again opens the valve 90 against the action of the spring 91. Oil is thereby permitted to flow from the hydraulic hose 32 past the needle valve 94 into the passageway 87 which is connected by the oil groove 83 with the left-hand branch outlet 74a of the outlet 74. After the valve 90 is opened, the right-hand end of the actuating plunger 96 opens the back end of the cylinder 95 to the outlet passageway 74a thus preventing further opening movement.

Any lowering of the shoe 42 to bring the parts to the position shown in FIG. 6 will result in lowering of the support 18 for restoring the control valve to neutral position so that as the machine progresses along the ground surface the position of the picker drum 14 relative to the ground will be modulated so as to follow the ground contour as sensed by the shoe 42. Since there is a shoe on each side of the row and both are connected together for simultaneous movement, the highest one will be the one that determines the action of the control valve, and a hump on either side of the row is thus sensed and compensated for in the automatic height adjustment for the picker drum. At the same time the drum is kept relatively close to the ground so as to avoid missing any cotton that is low on the stalk.

Since pocker drums are relatively heavy and the hydraulic control valve, if unregulated, would provide sudden surges of hydraulic power, the needle valve 100 permits restricted flow of oil from the inlet 72 to the outlet 74 when the control valve is in the raise position shown FIG. 5 so as to avoid sudden raising movement of the piston 28. If this provision were not made the inertia of the picker drum would result in the tires of the machine squashing down upon sudden application of hydraulic pressure to the cylinder 30. Reversely a sudden release of oil from the cylinder 30 would, due to the inertia of the drum, result in a tendency for the machine to bounce upwardly, and erratic operation of the system would result. Accordingly, the needle valve 94 is provided to restrict the reverse flow of oil as depicted in FIG. 6 and these features of the valve are claimed in the copending application hereinbefore referred to.

From the foregoing specification it will be obvious that we have provided an automatic height control system particularly adapted for hydraulically controlled crop manipulating heads and that the system is sensitive to ground contour conditions to automatically adjust a crop manipulating head relative to a row along which the machine is passing.

The parts of the system are so arranged that both sides of a row are sensed and each cotton picker head is raised or lowered independent of the other, thereby maintaining a desired height above the ground automatically to avoid damage to expensive picking drums or the like. Before operating the machine the adjusting knob 58 of FIG. 7 may be rotated for positioning the control valve in relation to the sensing shoe 42 while the shoe is contacting level ground. The operator is thereby able to select the distance of the lower end of the drum unit with respect to the ground surface and such distance will thereafter be automatically maintained. During operation the spring 62 acts as a semi-solid thrust member to transfer position of the collar 60 to the lever 40 but in some instances excessive upward movement of the shoe 42 might result in damage to the parts and is absorbed by compression of the spring 62.

The shoes 42 are located slightly forward and under the picker drums but close thereto, and in substantially lateral alignment therewith in order to properly sense changes in ground contour before the picker drum can be damaged. The needle valves 94 and 100 provide a means for adjusting the response characteristics of the system with respect to the control valve to meet rapid acceleration problems in the hydraulic system but with movements gradual enough to avoid undesirable erratic action or "hunting" of the system to regain neutral balance quickly after each control actuation. The free flowing hydraulic circuit depicted in FIG. 4 keeps the pressure off the pump when the control is not being activated thereby substantially lengthening pump life.

An automatic system of the kind disclosed eliminates the necessity of the operator attempting to manually adjust the picker drums to follow the ground contour which requires considerable skill and cannot be perfectly performed by even the most skilled operator. Accordingly damage can be encountered by reason of the crop manipulating heads gouging into the ground surface and may cause considerable expense to the extent that the installation of our automatic system soon pays for itself. At the same time the drums can be operated closer to the ground surface than when manually controlled and thereby will pick cotton low on the stalk that would otherwise be left in the field.

Some changes may be made in the construction and arrangement of the parts of our automatic height control system without departing from the real spirit and purpose of our invention, and it is our intention to cover by our claims any modified forms of structure or use of mechanical equivalents which may reasonably be included within their scope.

We claim as our invention:

1. In combination with a row crop machine having a crop manipulating head vertically adjustable relative to the frame of the machine and hydraulically operated means to effect such vertical adjustment; a system of the character described having ground contour responsive means for automatically controlling said hydraulically operated adjusting means and comprising feeler apparatus mounted on the machine frame and having a pair of ground engaging shoes located on opposite sides of the row being manipulated and in substantially lateral alignment with the crop manipulating portion of said head, a hydraulic control valve for said hydraulically operated adjusting means mounted on the crop manipulating head and having a neutral position, a "raise" position and a "lower" position, hydraulic connections from said control valve to said hydraulically operated means to effect raising of said crop manipulating head in the "raise" position of said control valve and lowering of said crop manipulating head in the "lower" position of said control valve, and an operative connection from said ground contour responsive means to said control valve to move it to "raise" position upon said ground contour responsive means responding to a rise in ground contour at the crop manipulating portion of said head and to move it to "lower" position upon said ground contour responsive means responding to a dip in the ground contour at the crop manipulating portion of said head, said ground engaging shoes being connected together for simultaneous raising and lowering movement relative to said crop manipulating portion of said head in response to the sensing of the ground contour and being further connected with said hydraulic control valve whereby the highest raised ground engaging shoe is effective to position the valve.

2. The combination set forth in claim 1 wherein there are a plurality of said crop manipulating heads, an individual control valve for each and a pair of ground engageable shoes for each, said control valves operating their respective heads independent of each other and said pairs of ground engageable shoes responding only to their own rows and actuating their respective control valves independently of each other.

References Cited by the Examiner

UNITED STATES PATENTS

| 2,660,015 | 11/53 | Briscoe | 56—11 |
| 2,674,075 | 4/54 | Snow | 56—11 |
| 2,700,857 | 2/55 | Stearman | 56—11 |
| 2,972,847 | 2/61 | Matthews | 56—11 |
| 3,088,264 | 5/63 | Sallee | 56—11 X |

FOREIGN PATENTS 491,058  3/53  Canada.

T. GRAHAM CRAVER, *Primary Examiner.*

RUSSELL R. KINSEY, *Examiner.*